Nov. 9, 1948. M. EATON 2,453,211
ELECTRIC STEAM GENERATOR CONTROL
Filed April 19, 1947 7 Sheets-Sheet 1
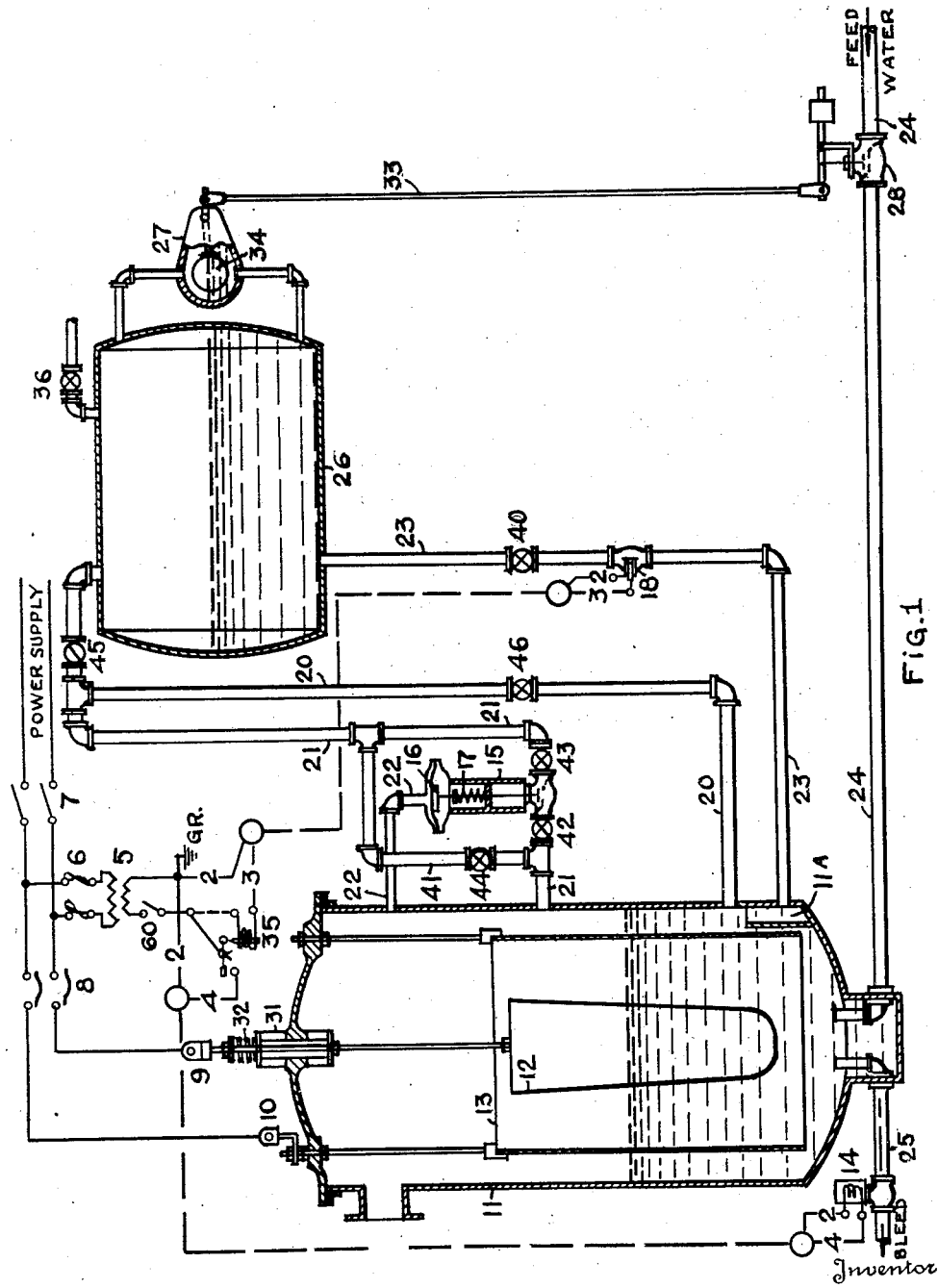
Inventor
MILTON EATON

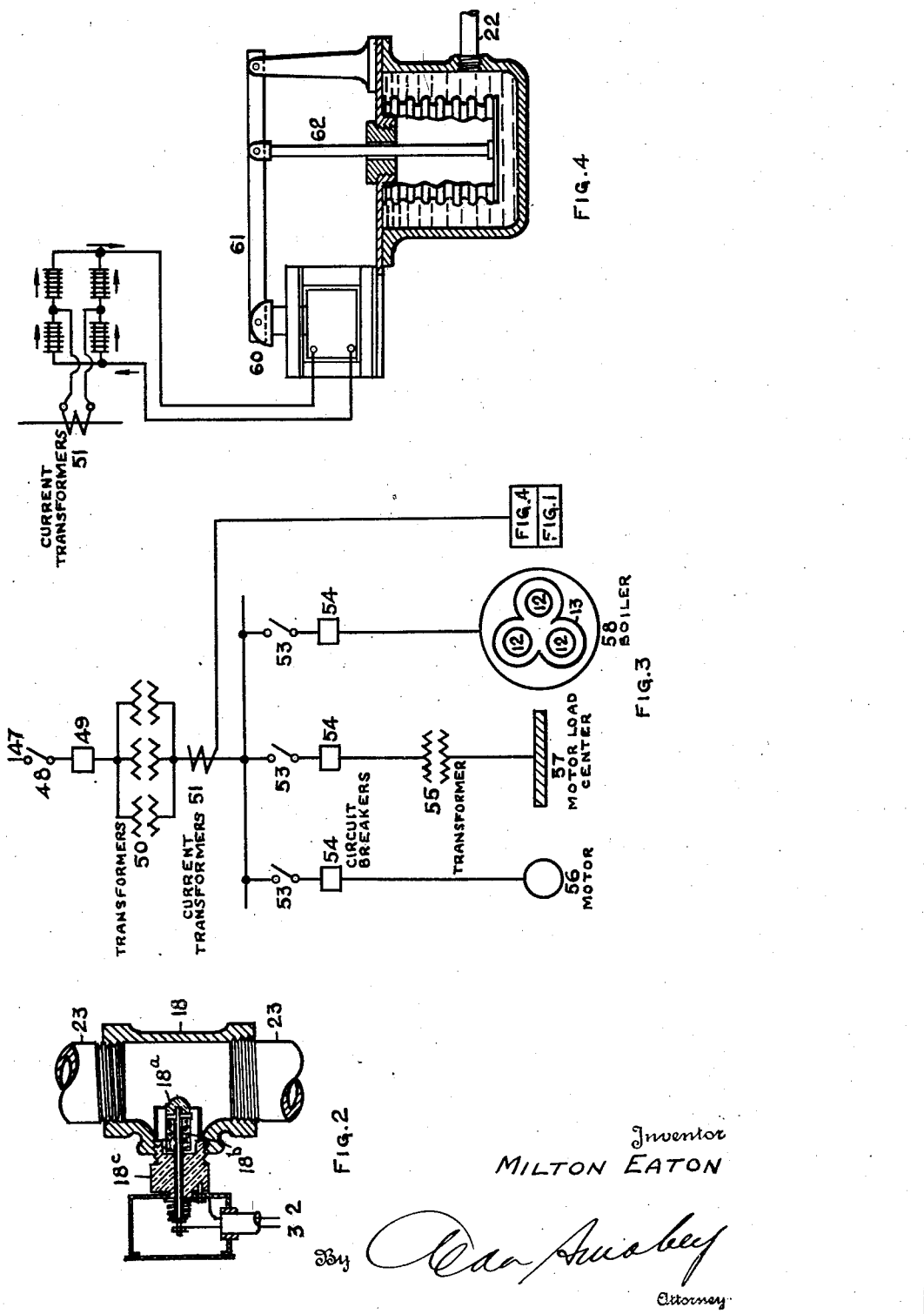

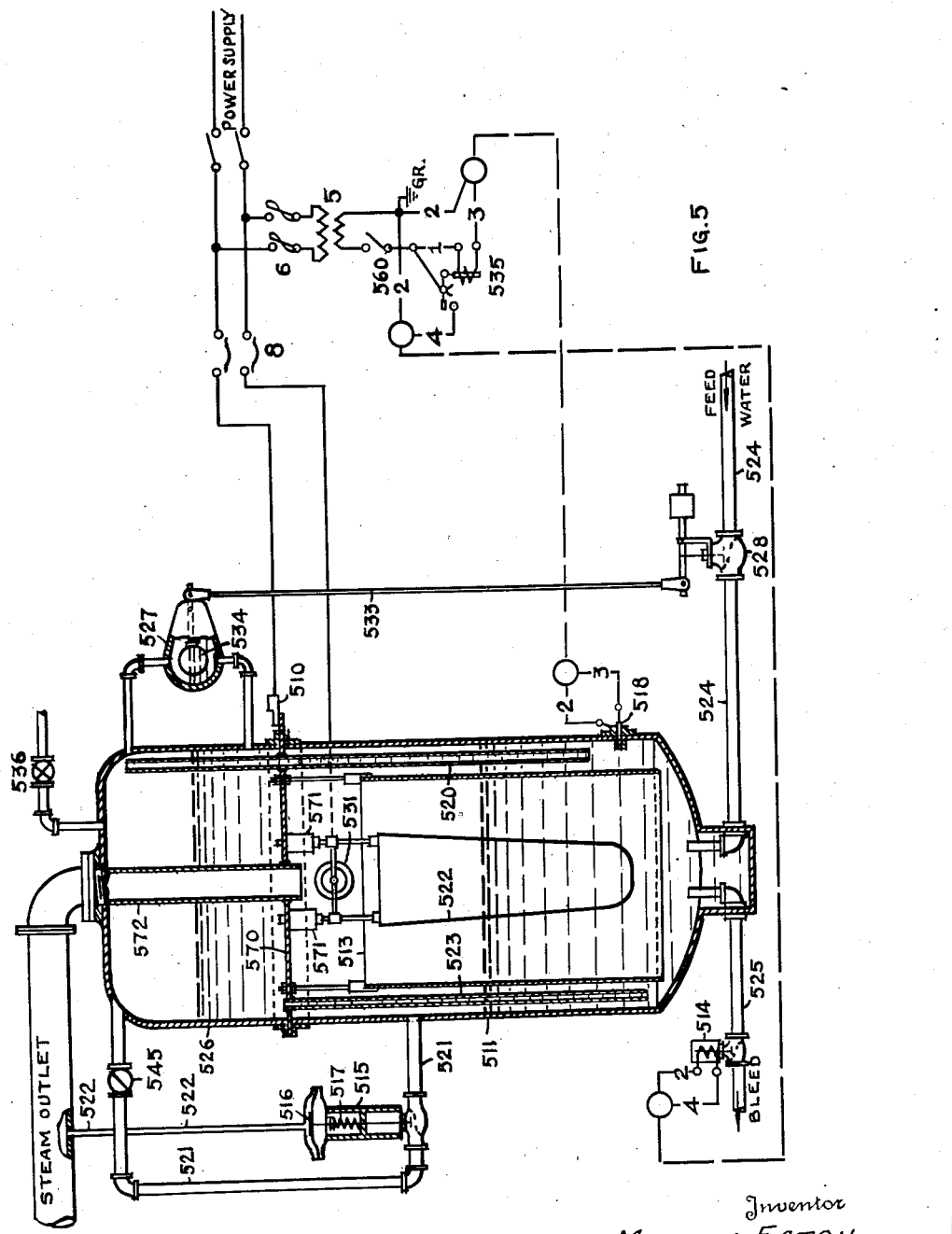

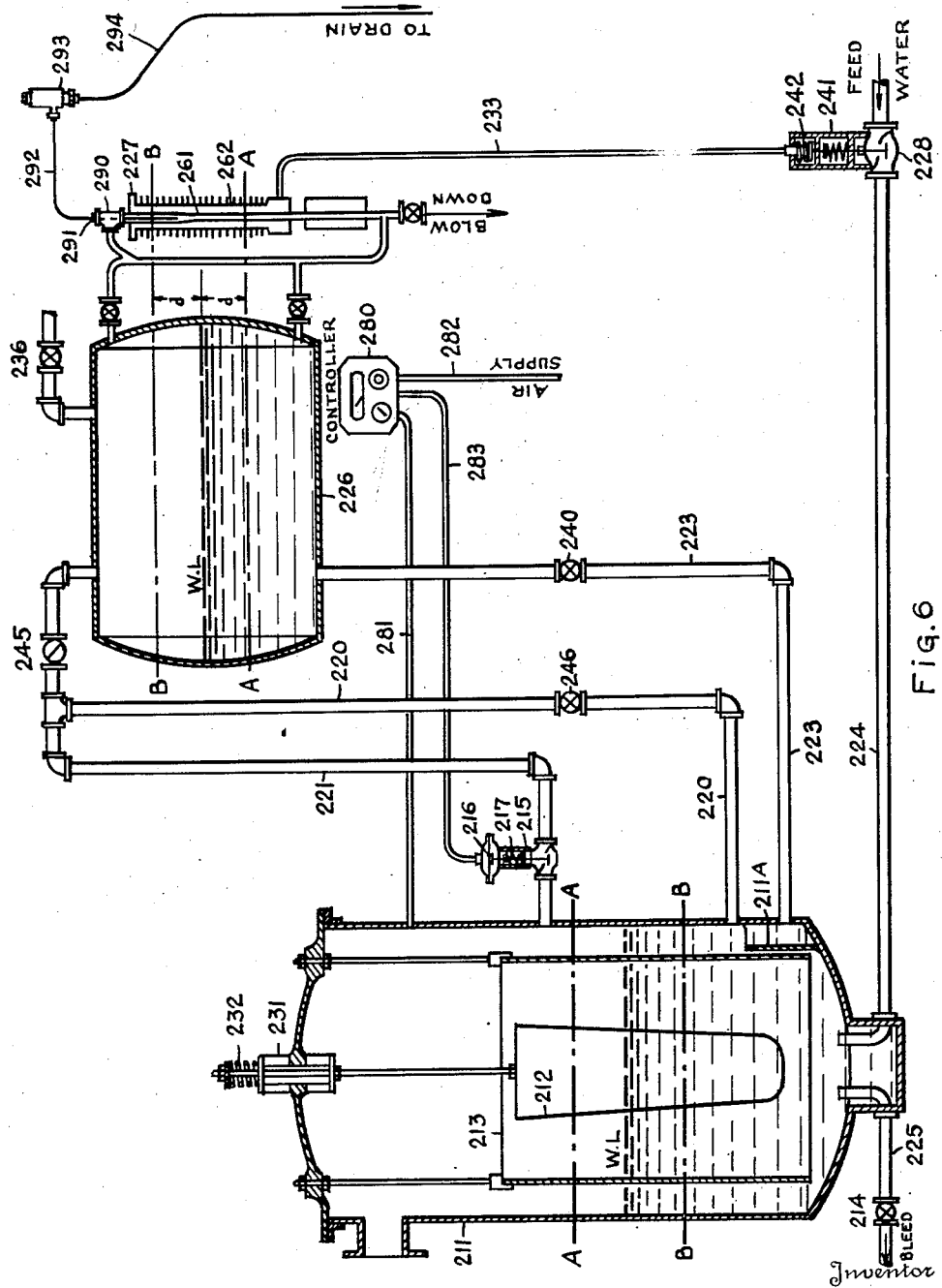

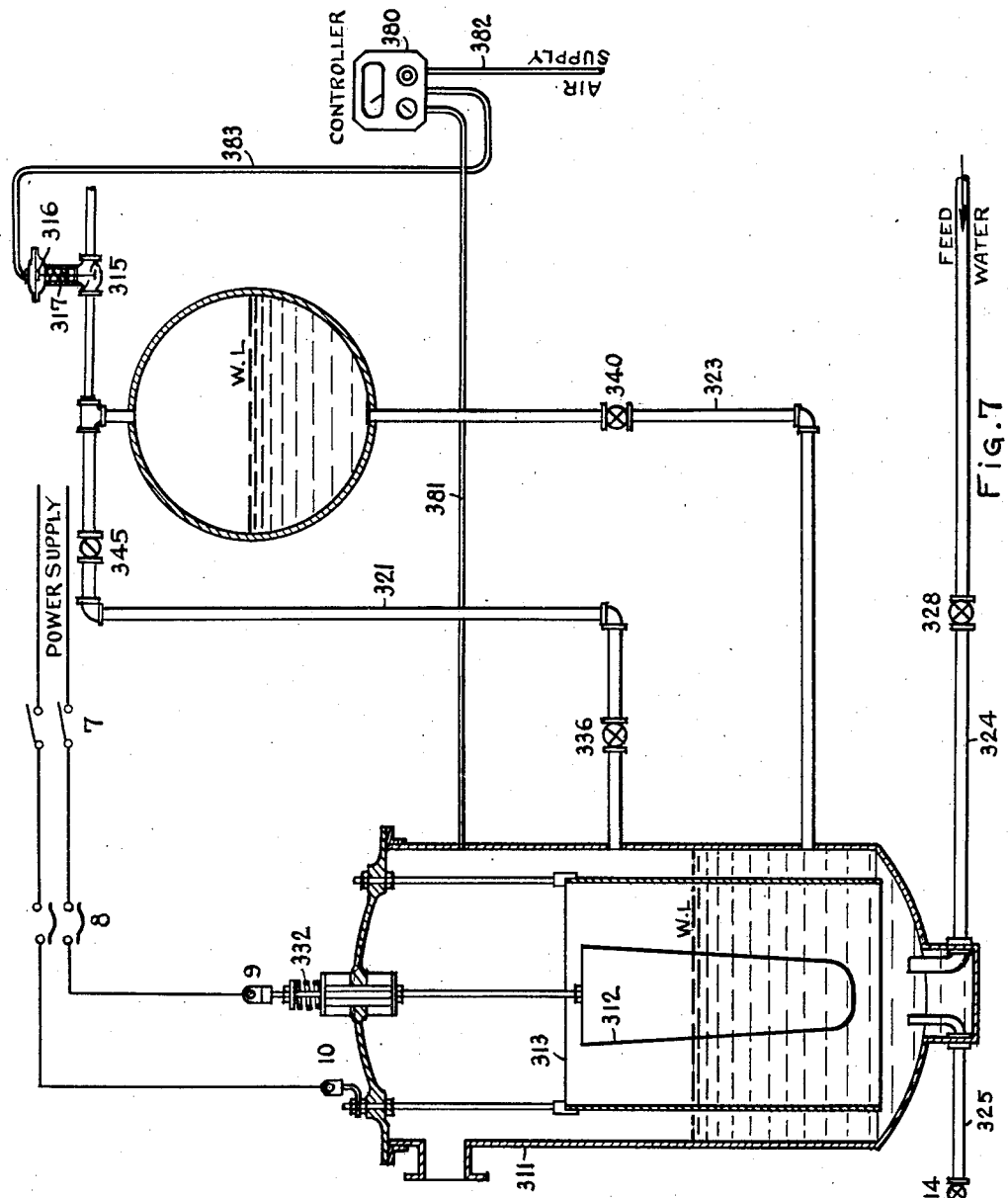

Nov. 9, 1948. M. EATON 2,453,211
ELECTRIC STEAM GENERATOR CONTROL
Filed April 19, 1947 7 Sheets-Sheet 7

Inventor
MILTON EATON

Patented Nov. 9, 1948

2,453,211

UNITED STATES PATENT OFFICE 2,453,211

ELECTRIC STEAM GENERATOR CONTROL

Milton Eaton, Shawinigan Falls, Quebec, Canada, assignor to Shawinigan Water & Power Co., Montreal, Quebec, Canada, a corporation of Quebec Application April 19, 1947, Serial No. 742,723

14 Claims. (Cl. 219—40)

This invention relates to improvements in the regulation of electric steam generators of the electrode type. This application is a continuation-in-part of application, Serial No. 595,755, filed May 25, 1945.

OBJECTS

Principal objects of the invention are (1) to improve feed water regulation for the purpose of obtaining more effective controller action, (2) to improve self regulation or "preset controller action" and (3) to provide improved means for partial automatic regulation; (4) to provide means for adapting the control apparatus to regulate two or more similar electric steam generators in parallel with common control equipment.

The present invention is featured by a novel method and means for regulating the boiler pressure or the power input (i. e. the rate of evaporation) in response to variations in the selected condition (or deviations from the control point of the selected condition) through automatic "gradatim" variation of the water level on the boiler electrodes. The invention is further featured by improved means for regulating the salt concentration in the boiler water and other improvements which will become evident from the specification.

DETAILED DESCRIPTION

The invention will be better understood from the following detailed description of preferred types of equipment in which it is embodied, it being understood that this equipment may be varied within the scope of the invention claimed. Reference will be made to the accompanying drawings illustrating this preferred equipment, and in which:

Figure 1 is a vertical sectional view of the type of boiler and control apparatus associated with it.

Figure 2 is an enlarged sectional view of the bleed control electrode and auxiliary features forming a part of the apparatus shown in Figure 1.

Figure 3 is a schematic diagram illustrating a typical arrangement in which the control apparatus functions to regulate the power input.

Figure 4 is an enlarged sectional view of the power-to-pressure converter used in the arrangement illustrated in Figure 3.

Figure 5 is a vertical sectional view of an alternative arrangement of an electric boiler of which the control tank is an integral part, and of the control apparatus associated with it.

Figure 6 is a schematic view showing more particularly a preferred feed water regulator.

Figure 7 is a schematic view showing an arrangement according to the invention whereby partial automatic control is obtained.

Figure 8:
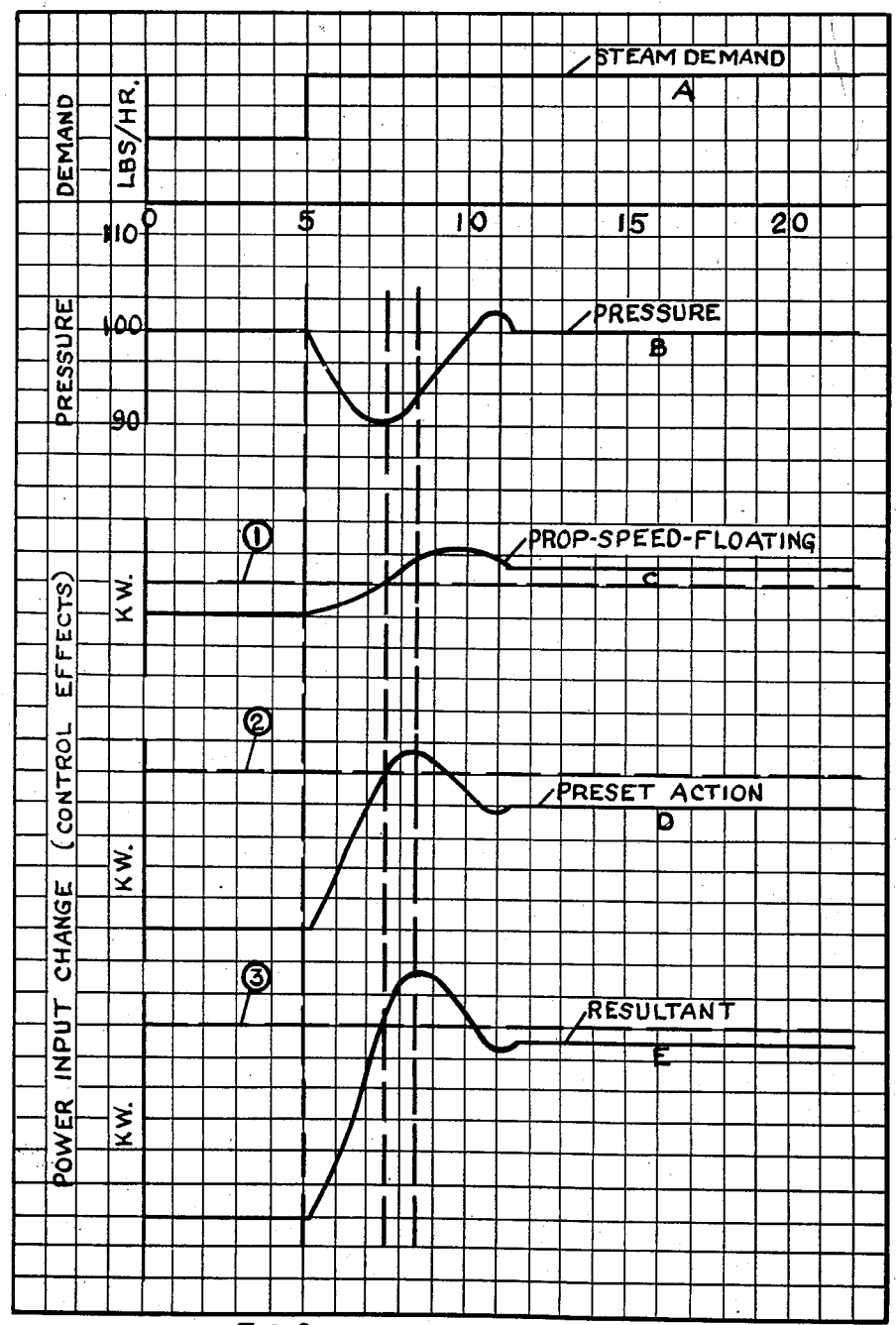
Figure 8 is a graph illustrating the action of the automatic control action according to the invention.

A sectional view of the type of boiler referred to is shown in Figure 1. In order to simplify description, the electric boiler 11 is shown as single phase with a single electrode 12 and single phase power supply, whereas they are usually made with three electrodes for three phase operation. Three single phase boilers, as illustrated, may be used as a three phase boiler with an electrode connected with each phase and the boiler shells electrically connected to form a grounded neutral.

The electric current, passing through the water surrounding the electrodes, generates heat energy that is dissipated in raising steam. Since the applied voltage is constant, the power input, or rate of evaporation which is directly proportional to the power input, is regulated by varying the current, which is governed by the resistance of its path through the water. This depends on (a) the specific resistance and temperature of the water, (b) the cross sectional area of the path, and (c) its mean length. The specific resistance depends on the concentration of salts in solution and the cross sectional area varies with the height of the water on the electrodes. Either of these conditions may be varied and used as a means of control. The power input is proportional to the electrode area immersed and the salt concentration in the water, and varies directly as the water level on the electrodes. The salt concentration tends to increase, due to salts carried into the boiler by the feed water, and is held within satisfactory limits by continuous or intermittent bleeding.

The control functions to maintain constant salt concentration and to regulate the controlled pressure by raising and lowering the water level on the electrodes between fixed limits. The salt concentration determines the conductivity of the boiler water. Means is provided to operate the bleed valve for reduction of salt content when the conductivity exceeds a predetermined value and the pressure is normal or high. It is inoperative when the pressure is low.

Control Apparatus

The top of an elevated control tank 26, Figure 1, is connected by pipe 21 with the boiler shell at a point corresponding with the upper limit of water level. A regulating valve 15 controls this communication. Manual valves 42, 43, and check valve 45 are connected in series with valve 15, and pipe 41 forms a bypass controlled by manual valve 44. Pipe 20, connected with pipe 21 at a point higher than the control tank and with the boiler shell at a point corresponding with the lower limit of water level, also bypasses valve 15. For simplicity in description, the valve 15 is shown as a spring-loaded pressure reducing valve whereas in practice an air-operated controller is used. (A "Fulscope" controller with "Motosteel" diaphragm valve, Catalogue No. 36R, Taylor Instrument Company, is found to be satisfactory.) The space between the levels of pipes 20 and 21 is the normal range of water level on the electrodes.

The bottom of the control tank is connected with the bottom of the boiler by pipe 23 in which valve 40 is located. A bleed control electrode 18, shown in detail, Figure 2, is connected in pipe 23. The essential parts of the bleed control electrodes are the electrode 18a with its connecting rod 18b, which are insulated, and the body, or plug, 18c, which is bored at the inside end to accommodate the electrode and to determine the length of the gap through which the bleed control current passes.

A transformer 5 is connected with the power supply by fused disconnecting switch 6. Switch 60 disconnects the ungrounded secondary lead 1 which is connected in series with the solenoid coil of relay 35 and the bleed control electrode terminal rod 18b. Transformer lead 2 is connected with pipe 23 and ground. Relay 35 is a current type with means for adjusting its operating current value. The contacts of relay 35 and solenoid of bleed valve 14 are connected in series across control power leads 1 and 2.

A float chamber 27 is connected with control tank 26 at its center line. Float 34 is arranged to move up and down as the water level in the control tank rises and falls and through linkage 33 decreases or increases the opening of feed water regulator valve 28 controlling feed water flow through pipe 24, which is connected with the bottom of the boiler and a source of water at a pressure higher than that of the boiler.

A manual throttling valve 36 controls a bleed connection at the top of the control tank which discharges steam to a low pressure system or to apparatus using steam at low pressure, such as a feed water heater.

The alternative air-operated controller, replacing pressure reducing valve 15 is shown with connections in Figures 6 and 7. The controller 280—380 has a steam pressure connection 281—381, control air pressure connection 282—382, and output air pressure connection 283—383. The controller functions to vary its output air pressure, and hence the opening of valve 215—315, in accordance with changes in the controlled pressure. The throttling range (or sensitivity) is adjustable.

Independent manually-operated means for admitting feed water to the boiler, controlling boiler water bleed, and feeding salt solution to the boiler are provided for starting up purposes.

Operation

In order to simplify description, it is assumed that the boiler has been put into service on manual control and that automatic control has been established by opening valves 40, 42, 43 and 46 and closing valve 44. Switch 60 must also be closed.

Assuming normal boiler pressure, as determined by the spring pressure of valve 15, corresponding with the set point of the air-operated controller, and water levels as indicated, valve 15 is throttled to pass just enough steam to equal the rate of bleed through valve 36 plus the rate of condensation in the control tank. Valve 36 is adjusted in operation so that when the controlled pressure is on the control point valve 15 is about half open.

Rising boiler pressure, transmitted through pipe 22, increases the steam pressure on diaphragm 16, thus decreasing the opening of valve 15. The rate of admission of steam to the control tank will then be less than the rate at which steam is bled off and condensed, and as the volume of steam in the control tank decreases it is replaced by water drawn from the boiler through pipe 23. As water is taken from the boiler, the level on electrode 12 falls, causing a decrease in power input and rate of evaporation, which returns the pressure to normal.

If the pressure falls below normal, the pressure on diaphragm 16 decreases, allowing spring 17 to increase the opening of valve 15. Steam will then rise through 21 faster than the rate of bleed from, and condensation in, the control tank. This tends to equalize control tank and boiler steam pressures, thus allowing water to flow back to the boiler by gravity through 23. This results in rising water level on the electrode with increased power input and rate of evaporation causing the pressure to return to normal.

The rate of transfer of water between control tank and boiler at any instant is determined by the opening of regulating valve 15 and the difference between boiler and control tank steam pressures. A momentary rise in boiler pressure increases the difference in pressures, causing water to be transferred to the control tank through 23 until the volume of steam in the control tank is compressed sufficiently to re-establish normal differences in pressures. Similarly a momentary fall in boiler pressure causes water to be returned to the boiler, not only by gravity, but also by control tank excess steam pressures, thus accelerating the rate of rise on the electrodes.

The boiler pressure is normally higher than the control tank steam pressure by an amount equivalent to the difference in water levels, which is the pressure drop across control valve 15 when the controlled pressure is at the control point. A rise in boiler pressure causes valve 15 to decrease its opening but there is still sufficient passage of steam through it to contribute towards an equivalent rise in control tank steam pressure by an amount depending on the valve throttling range and the time interval. If the boiler pressure falls below that of the control tank steam pressure, valve 15 increases its opening. The control tank steam pressure will fall an amount equal to the decrease in boiler pressure in a time interval depending on the rate at which steam is bled off through valve 36. The changes in water level on the electrode, for which boiler pressure fluctuations are directly responsible, are therefore proportional to the rate of change in the controlled pressure. The extent of water level change, due to this effect, depends on the steam storage capacity of the control tank and valve adjustments. The steam storage capacity determines the change in volume to which the steam is compressed or expanded to equal the boiler pressure changes and in response to transfer of water from or to the boiler.

According to A. S. M. E. terminology, since the power input is matched with steam demand to maintain constant pressure, the water level on the electrode, or the electrode immersion, which determines the power input, may be regarded as the final control element. Control valve 15, with its associated apparatus, is a proportional-position controller, the operation of which obtains a rate of change in water level proportional to the deviation of the controlled pressure from the control point. In addition controlled pressure fluctuations result in immediate changes in water level on the electrode proportional to the rate and amount of change in the controlled pressure. The operation of regulating valve 15 obtains what is known as proportional-speed-floating controller action. Changing boiler water level, directly responsive to pressure fluctuations, is similar to what is known as "preset" controller action. A regulator with these controller actions is the best obtainable for regulating unstable variables.

Electric boiler pressure is difficult to regulate with fluctuating steam demand mainly on account of low capacity lag, controller lag, and an unfavourable temperature coefficient of water resistance. As the pressure and boiler water temperature rise the conductivity and power input increase thus accelerating the rise in pressure; conversely, falling pressure reduces the power input when an increase is required.

Figure 8 serves to describe the control response graphically. A sudden change in steam demand occurs at time 5 as in curve A. The controlled pressure momentarily falls and is brought back to the control point as in curve B. Curve C shows the increase in power input, occasioned by rising water level on the boiler electrode, due to proportional-speed-floating control alone, while curve D shows that due to "preset controller action" alone. Curve E is the sum of the two control effects.

As indicated by the shape of curve C proportional-speed-floating controller action causes the power input to rise at a rate proportional to the deviation of the controlled pressure from the control point. At time 7½ the pressure begins to rise and consequently any further increase in power input would cause the pressure to overshoot the control point.

The "preset" controller action, curve D, is due to momentary difference between control tank and boiler steam pressures. As the boiler pressure, curve B, falls, water is transferred from the control tank to the boiler by excess control tank steam pressure with consequent rise in power input. When the pressure reaches its lowest value the control tank steam pressure has fallen to near that of the boiler and at time 8½ the boiler pressure begins to exceed the control tank steam pressure by an amount sufficient to cause transfer of water from the boiler to the control tank. The boiler water level therefore falls with resulting decrease in power input, consequently when the pressure reaches the control point, the power input is lower than it was when the pressure was at its lowest value. Lines 1, 2, and 3 indicate power input values at the instant the fall of pressure is stopped.

The sum of these control responses, curve E, shows why the pressure is brought under control without overshooting, thus resulting in control stability.

Similar controller action occurs in the event of an instantaneous decrease in steam demand with momentary rise in controlled pressure.

The control tank is approximately equal in volume to the section of the boiler between the upper and lower water level limits. The sensitivity, or throttling range, of valve 15 is adjusted in service to that at which the most satisfactory operation is obtained. In curve B, Figure 8, the throttling range would be 90 to 110 lbs. The mean pressure is determined by the controller "set point." The control point may be made to approach either the upper or lower limit of throttling range by the adjustment of valve 36. If the rate of dissipation of control tank steam is increased, valve 15 must increase its opening to supply it and to do so the controlled pressure or control point must fall to obtain the necessary controller response. Similarly, decreasing the rate of dissipation of control tank steam raises the control point in the throttling range. Curve B, Figure 8, indicates that the control point is on the set point or at the mean pressure. Because the complete controlling means operates as a floating type controller, the control point remains on the set point regardless of steam demand, i. e., there is no "droop" occasioned by change in demand.

Control apparatus and adjustments, as described above, permit the controlled pressure to be held within the throttling range of regulating valve 15 with instantaneous changes in steam demand up to 50% of the boiler capacity and with no steam storage other than what is provided by the boiler itself. Figure 8 illustrates the control response with a change in demand from 50% to 100% of the boiler capacity. Larger load changes may be effected but not without greater changes in the controlled pressure.

A larger control tank would permit greater instantaneous changes in steam demand, but the permissible range is limited by the time required to transfer water from the boiler to the control tank, or in the reverse direction, to effect water level changes on the electrode. Since this is part of the controlling means the limitation is due to controller lag. It is doubtful that apparatus of this type can be made to hold the pressure under control with instantaneous load changes exceeding 70% of the boiler capacity, or 70% of the load taken at the upper water level which depends on the bleed control point. When it is necessary to accommodate instantaneous load changes exceeding 50% of the boiler capacity supplementary steam storage equipment should be considered.

*Controlled pressure*

The controlled pressure may be the boiler pressure or the pressure at a point remote from the boiler, such as a steam header.

*Boiler water level limits*

If the boiler water level rises above the level of pipe connection 21, Figure 1, access of steam to pipe 21 is cut off and water is immediately transferred to the control tank by control action previously described. Similarly if the boiler water level falls below the point at which pipe 20 is connected, the water in the pipe runs out and steam rises through it, bypassing regulating valve 15, and causing water to be transferred from the control tank to the boiler. It is, therefore, apparent that the water level range is fixed regardless of steam demand or controlled pressure variations. The boiler load, corresponding with the water level, depends on the boiler water conductivity or bleed control point.

Bleed control

The boiler water conductivity is regulated as an independent variable by bleeding and with control apparatus as previously described. The control point is adjusted by means for determining the current at which relay 35 closes its contacts.

The bleed control electrode, with its assembled parts, constitutes a miniature electric boiler. The water in which the electrode is immersed has periodically the same concentration of salts in solution as that of the boiler water and the applied voltage has a fixed ratio with the boiler voltage. Since the bleed control electrode is always completely immersed the current depends entirely on the water conductivity or salt concentration. When this reaches a predetermined value relay 35 closes its contacts to energize bleed valve 14 which opens to bleed off water from the boiler. As bleed water is taken from the boiler it is replaced with relatively pure feed water, thus diluting the boiler water and reducing the conductivity to normal at which valve 14 recloses. The rate of bleeding is adjusted by means of a manual throttling valve (not shown) which is connected in series with valve 14. The optimum rate of bleeding depends on feed water salt content and other conditions.

The water in the control tank has lower salt content than that of the boiler because it is diluted by condensed steam. Consequently as water is being transferred to the boiler, on a fall of pressure, the current taken by the bleed control electrode decreases causing relay 35 to open its contacts, if closed, and the bleed through 14 to stop. This permits the water level in the boiler to rise faster, and higher conductivity to be maintained, thus facilitating recovery of normal pressure. Similarly the bleed valve tends to open when water is being transferred to the control tank on rise of pressure, thus assisting to restore normal pressure.

The bleed control apparatus functions as a simple two position controller which is satisfactory because of large capacity lag in salt concentration.

When the control functions to maintain constant power input, as described later, it would be preferable to locate the bleed control electrode 518 in the boiler shell as shown in Figure 5. The boiler water salt content, or conductivity, is then regulated independently. This arrangement, with a pressure-actuated switch connected in series with the contacts of relay 535 and adjusted to prevent bleeding on low pressure, would also obtain the same results as the bleed control apparatus shown in Figure 1.

Bleed valve 14 may be motor-operated or air-operated. If air-operated, relay 35 would be connected to energize a 3-way valve controlling the air pressure on the bleed valve diaphragm.

Feed water regulations

The preferred Bailey thermo-hydraulic feed water regulator, referred to in application #595755, page 12, line 30, is shown in Figure 6 with the arrangement and associated apparatus necessary to obtain the most effective controller action. This regulator includes the generator assembly, part 227, valve 228, and interconnecting tubing 233. The generator has an inner tube 261 communicating with the control tank 226 at a point above its center line, or mean water level, and a point below the mean water level so that the water level in 261 always corresponds with the water level in the control tank. An outer concentric tube 262 is connected with bellows 242 of the regulator valve 228 by means of tubing 233. The outer tube 262, tubing 233, and bellows 242 are filled with water when cold. The liquid pressure in bellows 242 tends to keep valve 228 open and the pressure of spring 241 tends to close it. As the water level rises and falls in the control tank the proportion of tubes 261 and 262 filled with water or steam changes accordingly. When the water level falls, steam in 261 evaporates water in 262 until their water levels correspond. Rising water level in 261 condenses steam in 262 until the levels are again equal. Water level changes result in corresponding changes in the amount of steam in 262 thus varying the pressure in bellows 242. These pressure variations control the opening of valve 228 in such a way that the water level in the control tank tends to be held constant. This is a proportional-position type regulator, i. e. the valve opening is proportional to the deviation of the controlled level from the control tank center line or "set point." The control point depends on the demand for water.

In Figure 6 the indicated water levels "WL" correspond with mean boiler load. Levels AA and BB correspond with heavy load and light load respectively. When the boiler load is heavy the water level must fall in element 227 to obtain the required opening of valve 228. This results in high boiler water level and low control tank water level. Similarly at light load the boiler water level is low and the control tank water level is high.

The distance "d" between the set point and the control point is defined as "droop" and in this instance it is determined by the length and slope of element 227, which is mounted vertically to exaggerate the "droop" in contrast to previous applications in which it is inclined to obtain higher sensitivity and a minimum "droop."

At heavy load the boiler water level is high and consequently there is little use for storage water in the control tank but considerable potential use for storage space, conversely at light load more storage water than storage space is desirable. In this application exaggerated droop is consequently an advantage. However, it should not alter the steam space in the control tank enough to affect adversely the "present control action" previously described. Satisfactory results are obtained when $2d$ does not exceed 20% of the diameter of the control tank.

An increase in steam demand, causing the controlled pressure to fall, results in transfer of water from the control tank to the boiler to raise the power input. At the same time the feed water regulator responds to the falling water level in the control tank to increase the rate of feed water flow to the boiler.

The falling steam pressure is brought under control more rapidly if the rise in water level on the electrodes is effected entirely by transfer of water from the control tank. If it is partly accomplished by an accelerated rate of flow of feed water, additional heat energy is required to bring the feed water up to steam temperature. The accelerated flow of feed water also dilutes the boiler water, reducing its salt content and hence its conductivity. The best results are obtained with an appreciable time lag in feed water regulator response. This is obtained by desensitizing the regulator with vertical mounting of the thermo-hydraulic generator 227, and by taking advantage of instrument lag due to the time required to evaporate or condense water in tube 262.

The most suitable type of feed water regulator for this application is, therefore, one having considerable "droop" and instrument lag. An air-operated feed water regulator, such as a Bailey Bulletin No. 106 Feed water control, with adjustable low sensitivity would also obtain the desired performance.

Air bleeding

Steam condenses in the control tank due to contact with water below steam temperature and as it condenses permanent gases tend to accumulate. The gas is mostly air carried into the boiler by the feed water and released with the steam. The baffle 211A, shown at the boiler end of pipe 223, Figure 6, serves to cause water transferred to the control tank to be taken from the boiler at a point where the water is near steam temperature thus obtaining a minimum rate of condensation in the control tank. It also serves to separate air from water entering pipe 223 thereby avoiding interference to gravity flow through this pipe due to air pockets.

A single steam connection at the top of the control tank could be made with the bleed through valve 315 located in a continuation of pipe 321 and intermediate T connection to the tank as shown in Figure 7. The connections are made as shown in Figure 6 with pipe 321 connected at one end of the control tank and the bleed connection at the opposite end, thus causing all steam bled off through valve 236, for control purposes, to be swept through the tank carrying air with it. This avoids adverse control effects that would result with high air concentration. Even with this means of air bleeding there may still be sufficient left to interfere with normal operation of the thermo-hydraulic generator 227, Figure 6. If air accumulates in 261, rather than steam, the required thermal action is not obtained and unsatisfactory feed water regulation results.

Accumulation of air in 261 is avoided by means of an air bleeder made with tubing 292, which passes through pipe plug 291 into 261. The outer end is connected with a thermostatic steam trap 293. Steam rising through 292 heats the actuating element of 293 which expands thus closing its discharge valve. Condensed steam runs back to 261. If air enters 293 the actuating element cools and contracts. This causes the valve to open and the air to be discharged through tubing 294. Steam following the air reheats the valve-actuating element thus reclosing the valve.

Partial automatic control

Figure 7 shows an arrangement of control apparatus that may be used for partial automatic control. The feed water regulator and boiler bleed control apparatus are omitted and their function is accomplished by manual operation of valves 328 and 314.

Pipe 220, Figure 6, is also eliminated with pipe 323 connected to the boiler at the lowest limit of water level. With partial manual operation it is not necessary that pipes 321 and 323 should be connected with the boiler at the levels indicated. However 321 must not be lower than the upper limit of water level and 323 must not be higher than the lower limit.

If the boiler water level falls below 323, and valve 336 is closed, water will flow through pipe 323 to the boiler at the same time as steam rises through it in the opposite direction to supply the bleed through valve 315 and that required to replace the water. This can be done but not without disturbance similar to water hammer. However, this would not be appreciable if pipe 323 were short and relatively large.

The preferred type of controller referred to in application #595,755 is illustrated in Figures 6 and 7. The controller 280—380 has a steam pressure connection 281—381, input air pressure connection 282—382 and output air pressure connection 283—383. The controller functions to vary its output air pressure, and hence the opening of valve 215—315, in accordance with changes in the controlled pressure. The throttling range (or sensitivity) is adjustable.

The arrangement shown schematically in Figure 6 includes feed water regulation but does not include boiler water bleed control.

Power input control

Figure 3 illustrates a typical arrangement in which electric boiler 58 is used to maintain constant load on transformers 50. Switches 53 and circuit breakers 54 control three feeders. 56 is a large motor. Transformer 55 reduces the voltage for motor load center 57.

It is assumed that the electric boiler is operated in parallel with a coal or oil fired boiler to supply steam for heating purposes. The electric boiler is required to take more power as the motor load decreases and vice versa, while the associated coal or oil fired boiler functions to maintain the steam pressure.

In order to use the electric boiler pressure control, as described above, for this purpose it is necessary to employ a power-to-pressure converter. A device similar in operation to that of the apparatus shown in Figure 4 would obtain the desired result.

The load on transformers 50 is proportional to the secondary current of current transformer 51 which is rectified and passed through the solenoid coil of the device shown in Figure 4. As the current varies the pull on plunger 60 changes accordingly. The pressure resulting from this pull is transferred to the liquid in the pressure chamber through linkages 61 and 62. The pressure element of valve 15, Figure 1, is connected with pipe 22, Figure 4, rather than with the boiler.

The pressure control point of valve or controller 15 is made to correspond with the desired load current through current transformer 51. If the transformer load increases, the solenoid pull and liquid pressure, Figure 4, increase. The control then functions to reduce the electric boiler load, which in turn reduces the transformer load and restores normal liquid pressure. Similarly if the transformer load falls, the boiler control will function to increase the boiler load and restore normal transformer load.

Alternative arrangement

Figure 5 shows another arrangement wherein the control tank is an integral part of the boiler. A diaphragm plate 570, from which electrode 512 is supported by insulators 571, divides the boiler into an upper control tank section and a lower steam generating section. Steam outlet pipe 572 supports the diaphragm plate. The power entrance bushing and insulator 531 is located in the side of the boiler rather than in the top as in Figure 1.

Pipes 520 and 523 are inside the boiler and consequently no valve is shown in pipe 523. This valve is not required if the pipe is the right size for the required rate of flow through it.

Bleed control electrode 518 is located in the side of the boiler instead of in pipe 523 and consequently the operation of the bleed valve depends only on the boiler water conductivity or salt concentration, i. e. it is independent of the controlled condition.

Alternatively, pipes 520 and 523 may be located outside the boiler with the valve 540 and electrode 518 connected in pipe 523. The operation would then be the same as described for the arrangement shown in Figure 1.

The diaphragm chamber of valve 515 is connected with the steam outlet pipe rather than directly with the boiler, as in Figure 1. This determines the point at which the steam pressure is controlled. When it is as shown, the controlled pressure is the boiler pressure less the pressure drop in the steam main, which is proportional to the rate of flow of steam or steam demand. Any change in steam demand causes the controlled pressure to change more rapidly and to a greater extent than the boiler pressure thus causing valve 515 to operate before the boiler pressure changes appreciably and in the right direction to hold it under control. This arrangement enables the control to anticipate changes in the controlled condition and to preact in such a way as to minimize them.

It is understood that the response of the valve 515 to the pressure in the steam main is not necessarily limited to the particular apparatus illustrated in Figure 5. It may be, for instance, employed in connection with the apparatus shown in Figure 1, or in connection with other arrangements. While in the drawings the connection between the valve 515 and the steam line has, for convenience, been shown close to the boiler, it will be understood that this connection may be quite remote from the boiler.

The method of obtaining automatic regulations may be briefly described as follows:

Supplying feed water to the boiler in response to the water level in the control vessel, continuously bleeding steam from the boiler to the control vessel for control purposes, continuously dissipating control vessel steam, varying the ratio of the rate of bleeding steam from the boiler to the rate of steam dissipation by maintaining one constant and varying the other in response to deviation of the selected condition from the control point, thereby maintaining constant water levels in the boiler and control vessel when the said ratio is unity, transferring water from the boiler to the control vessel when said ratio is less than unity, and returning water from the control vessel to the boiler when said ratio is greater than unity.

Two means for dissipating control vessel steam are described in patent application #595,755, the condensing method, referred to in lines 1 to 10, page 8, and the alternative bleed method described in lines 13 to 21, page 10.

The ratio of the rate of bleeding steam from the boiler to the rate of steam dissipation may be varied by holding either one constant and varying the other with controlling means responsive to the controlled condition. The preferred method is to maintain the rate of steam dissipation constant and to vary the rate of steam bleed from the boiler. The alternative arrangement is shown in Figure 7 whereby valve 315 varies the rate of steam dissipation, or steam bleed from the control vessel, while the rate of steam bleed from the boiler is held constant by the fixed adjustment of valve 336.

Referring to Figure 1, application #595,755, it is obvious that if the positions of valves 30 and 15 were interchanged, the rate of dissipation of control vessel steam by condensation may be varied in response to the controlled condition, while the rate of steam bleed from the boiler is held constant thereby obtaining similar controller action.

"Preset" controller action

Self regulation, or control action independent of the operation of control valves, is described in lines 12 to 32, page 9, of application #595,755. This self regulation is further described in the amendment dated Nov. 26, 1946, on pages 2 and 3, and shown to be similar to "preset controller action" as defined by A. S. M. E. terminology.

It is found that the "preset" controller action is improved by putting a check valve in the steam communication between the boiler and control vessel to prevent flow of steam from the control vessel to the boiler. Referring to Figure 6, when the boiler steam pressure falls below that of the control vessel, valve 215 increases its opening and check valve 245 prevents boiler and control vessel steam pressures being equalized by reverse flow of steam through pipe 221. The excess steam pressure in the control vessel is therefore expended to a greater extent by forcing water through pipe 223 to the boiler and thereby causing a greater increase in boiler power input.

When the boiler pressure rises, valve 215 decreases its opening thereby preventing appreciable equalizing effect.

If valves 315 and 336 are interchanged with regard to position, as shown in Figure 7, valve 336 remains open with rising boiler pressure and consequently the above mentioned steam pressure equalizing effect would be quite appreciable. For this and other reasons the preferred locations of these valves are as shown in Figure 6.

Parallel operation of electric boilers

Figure 9:
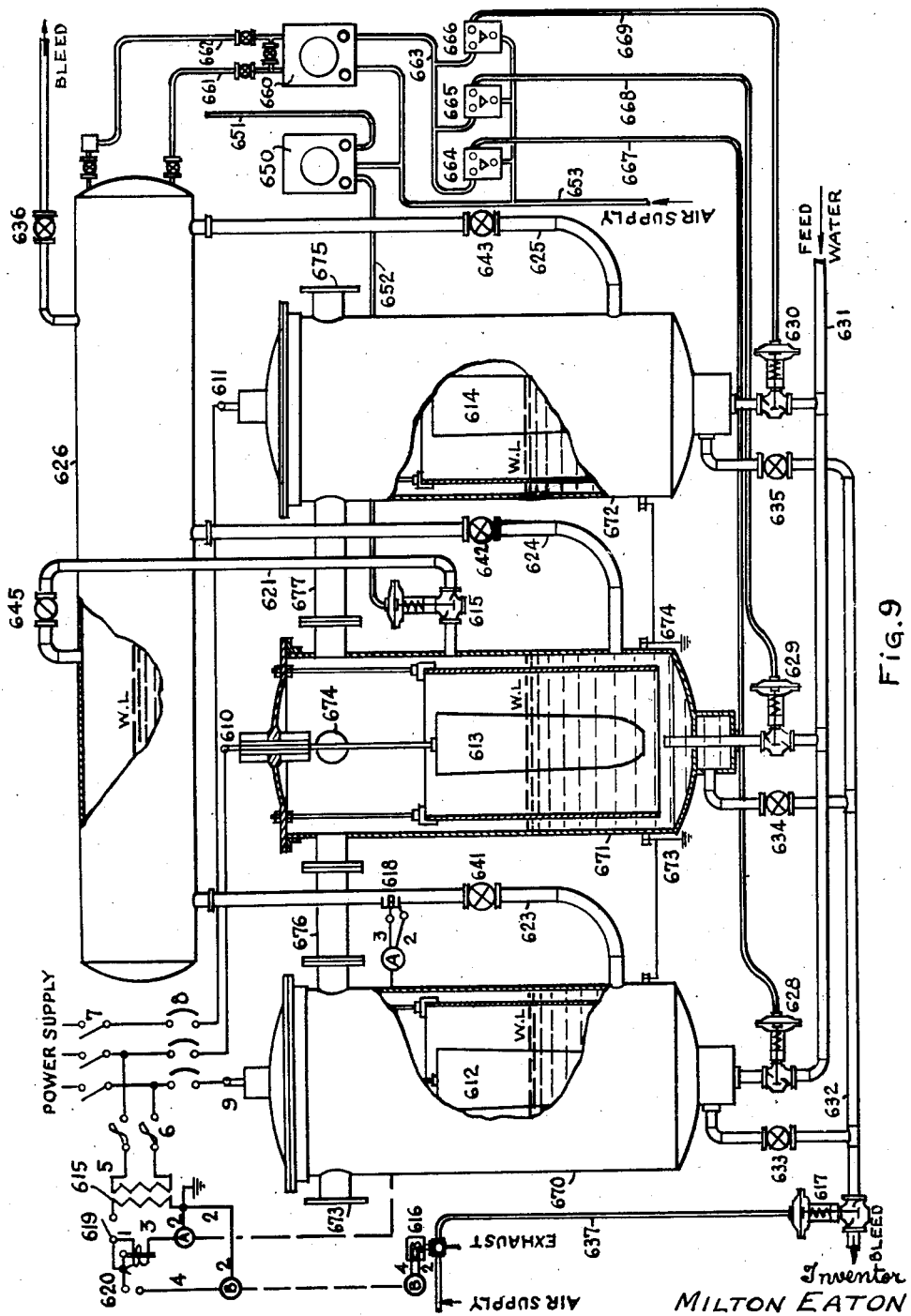
Figure 9 is a view showing the arrangement of apparatus for operating three single phase electric boilers as a three phase unit.

Lines 13 to 19, page 4, of application #595,755 refer to three single phase boilers connected and operated as a 3 phase unit. A specific control apparatus and connections of this description are shown in Figure 9.

Three single phase electric boilers 670, 671 and 672 are connected with the three phases of the power supply through their terminals 9, 610 and 611. Their steam outlets 673, 674 and 675 are connected with a steam header, not shown, 676 and 677 are steam pressure equalizing connections. Pipes 623, 624 and 625 connect the bottom of the elevated control vessel 626 with boilers 670, 671 and 672 respectively, at points corresponding with their lowest operating water levels. Manual valves 641, 642 and 643 are located in these connections. Pipe 621 connects the top of the control vessel with boiler 671 at a point corresponding with the upper limit of water level. Check valve 645, preventing flow of steam towards the boiler, and control valve 615 are located in this connection. Valve 636 controls steam bleed from the control vessel.

Valve 615 is regulated by the output air pressure of a proportional controller 650 through tubing 652. Tubing 651 connects the controller with the point at which the pressure is controlled, preferably the steam header. Control air pressure is supplied through tubing 653.

Controller 660, connected with control vessel 626 by tubing 661 and 662, and with feed water regulating valves 628, 629 and 630 through tubing 663, auxiliary devices 664, 665, 666 and tubing 667, 668, 669 is a Bailey air-operated feed water regulator. This regulator, previously referred to, is described in Bulletin #106—A of the Bailey Meter Co.

Manually adjusted bleed valves 633, 634 and 635 control bleed connections with pipe 632 in which bleed control valve 617 is located. This is an air-operated valve controlled by a 3-way solenoid valve 616 through tubing 637. Valve 616 is connected with bleed control apparatus including transformer 615, current relay 620, and bleed control electrode 618 by conductors 1, 2, 3 and 4 as shown in the connection diagram, Figure 9.

The water levels in boilers 670, 671 and 672 must remain equal because their respective steam pressures are equal and they support a common head of water in the control vessel through their water connections 623, 624 and 625. The control functions to vary the water level in the three boilers in response to deviation of the controlled pressure from the control point, as described in application Serial No. 595,755.

It is important that the current taken by the boilers from the 3-phase supply should be balanced. With even water levels on the electrodes, the current taken by each will be equal only if the conductivity of the water in each boiler is the same. This depends on the rate of feed water supply to, and the rate of bleed from, each boiler. The salt content and conductivity will be less in the boiler having either the highest rate of feed water admission or the highest rate of bleed; consequently they must be made equal.

Controller 660 automatically adjusts its output air pressure to tubing 663 in response to means for measuring the water level in the control vessel including connections 661 and 662. Devices 664, 665 and 666 are used to adjust the ratio of the output air pressure transferred through tubing 667, 668 and 669 to the diaphragms of regulating valves 628, 629 and 630 respectively, thereby determining the proportion of the feed water supplied to each boiler. It is obvious that these devices provide sufficient means for equalizing the flow to each boiler.

The boiler water bleed control functions as an on-and-off controller and in the manner previously described. Because the rate of bleed, as determined by the adjustment of valves 633, 634 and 635 is constant, these valves may also be used effectively to equalize the proportion of bleed water taken from each boiler.

With adjustments made as described above, the three boilers operate as a 3-phase unit maintaining the controlled pressure on or near the control point with balanced load on the three phases of the power supply.

Figure 9 illustrates the arrangement of three single phase boilers with control apparatus for operation as a 3-phase unit. Two or more similar single tank, 3-phase boilers may also be operated in parallel with a common control vessel in a similar manner. In this instance, however, it would not be essential to have equal current taken by each boiler, on the contrary it might be desirable to have one boiler take a greater load than the other or others. This may be done by adjusting the rates of feed and bleed to maintain a higher salt content and resulting conductivity in the boiler required to take the greater load.

An object is to provide a minimum of control equipment for the automatic operation of electric boilers in parallel. Separate electric boilers, having independent and complete control apparatus, may be operated in parallel by making their controllers responsive to the pressures in their respective boilers and adjusting their control points to correspond with the desired boiler loads. Raising or lowering the control point for any one of the boilers operated in parallel, raises or lowers the proportion of load it takes.

Modifications in arrangement and control apparatus may be made. By-passes, similar to that provided by pipe 220, Figure 6, may be supplied for determining the lower limits of water level on the electrodes. Pipes 623, 624 and 625, Figure 9, and pipe 323, Figure 7, are similarly connected with control function as described under the heading "Partial automatic control." A common manifold or header may be connected with each boiler at its upper limit of water level and control valve 615 with check valve 645 located in a pipe connecting this header with the top of the control vessel. Similarly pipes 623, 624 and 625 may be connected with a header which in turn is connected with the bottom of the control vessel by means of a pipe having the bleed control electrode 618 located in it. The use of these headers is desirable when the parallel-operated boilers are 3-phase in order to provide means for shutting down or starting up any one of them. Bleed control valve 617 may have a manually controlled by-pass through which bleed water is discharged at a constant rate, thus obtaining over-and-under rather than on-and-off bleed control. The more simple type of feed water regulator, shown in Figure 6 may be used with a single feed water regulator valve and piping arrangement similar to that of the bleed control. The feed water regulator shown in Figure 9 provides more adequate adjustment for phase balancing. The more simple thermo-hydraulic regulator may be used when the boilers are of the single tank, 3-phase design and phase balancing is unnecessary. For the same reason pressure equalizing connections such as 676 and 677, Figure 9, are not required.

MODIFICATIONS

The various advantages of the method and apparatus disclosed will become apparent to those skilled in the art.

It will also be understood that various additional modifications, to those already mentioned, may be made in the specific embodiments disclosed without departing from the spirit of the invention or the scope of the claims.

The sub-titles used throughout the specification are merely to simplify reference thereto and should otherwise be disregarded.

I claim:

1. An apparatus for regulating electric boilers of the electrode type to maintain a selected condition constant, comprising the combination of, an electric boiler having at least one electrode therein, a main steam outlet therefrom and a feed water communication thereto, an elevated control pressure-vessel separate from said steam outlet and from said feed water communication, a water communication between the boiler and the control vessel from locations at least as low as the lowest operating water level in the boiler and in the control vessel respectively and separate from said feed water communication, a control steam bleed communication from the boiler to the control vessel from and to locations at least as high as the highest operating water level in the boiler and in the control vessel respectively, steam dissipating means for dissipating control-vessel-steam whereby the pressure in the control vessel is normally maintained lower than that in the boiler, control means for regulating the flow of steam through said control steam bleed communication, means to prevent the steam pressure in the boiler and control vessel respectively being equalized by reverse flow of steam through the steam communication, control means for regulating said steam-dissipating means, means for measuring the selected condition, one of said control means being responsive to said measuring means, the other control means being adapted to remain in fixed adjustment, means for measuring the water level in the control vessel, and controlling means responsive to said water level measuring means for regulating the flow of water through said feed water communication, said water level measuring means and controlling means constituting a liquid level controller.

2. An apparatus, according to claim 1, wherein the steam dissipating means includes a bleed connection in the control vessel at a location above the highest operating water level, and a control valve responsive to the controlled condition for controlling said connection.

3. An apparatus, according to claim 1, including means for adjusting the sensitivity of the liquid level controller such that the difference between liquid levels corresponding with the fully-open and fully-closed positions of the control valve is equal to more than half of the depth of the control vessel.

4. An apparatus according to claim 1, including means for adjusting the rate of response of the liquid level controller to changes in controlled water level.

5. An apparatus, according to claim 1, wherein the measuring means of the liquid level controller is adapted to be actuated by the difference between control vessel steam and water temperatures.

6. An apparatus, according to claim 1, wherein the sensitivity of the feed water regulator is adjusted to obtain delayed response to changes in the controlled water level.

7. An apparatus, according to claim 1, wherein the measuring means of the liquid level controller is adapted to be actuated by the difference between control vessel steam and water temperatures, and the sensitivity of the feed water regulator is adjusted to obtain delayed response to changes in the control water level.

8. An apparatus, according to claim 1, wherein the measuring means of the liquid level controller is adapted to be actuated by the difference between control vessel steam and water temperatures, including means for removing air from the steam in the heat actuated device comprising the feed water regulator measuring means.

9. An apparatus, according to claim 1, including a thermo-hydraulic type of feed water regulator with the water level regulator connected with the control vessel and mounted in such a way as to obtain a wide throttling range.

10. An apparatus, according to claim 1, including means for obtaining a time lag between change in control vessel water level and feed water regulator response for the purpose of effecting water level changes on the electrodes by transfer of water to or from the control vessel rather than by changes in the rate of feed water flow to the boiler.

11. An apparatus for regulating electric boilers of the electrode type to maintain a selected condition constant, comprising the combination of a plurality of similar electric boilers located at the same operative elevation and having at least one electrode in each, a main steam outlet from and a feed water communication to each boiler, steam pressure equalizing connections between the boilers located above the highest operating water level in each, an elevated control pressure vessel separate from said steam outlets and from said feed water communications, a water communication between each boiler and said control vessel from locations at least as low as the lowest operating water level in the respective boilers and in the control vessel respectively and separate from said feed water communications, a control steam bleed communication from at least one of the boilers to the control vessel from and to locations at least as high as the highest operating water level in the boilers and in the control vessel respectively, steam dissipating means for dissipating control vessel steam, control means for regulating the flow of steam through said control steam bleed communication, control means for regulating said steam-dissipating means, measuring means for measuring the selected condition, one of said control means being responsive to said measuring means, the other control means being adapted to remain in fixed adjustment, means for measuring the water level in the control vessel, control means for regulating the flow of water through said feed water communications responsive to said water level measuring means and means for adjusting the relative rates of feed water flow through the respective feed water communications.

12. An apparatus, according to claim 1, in which the selected condition controlled is the pressure in the steam system at a point remote from the boilers.

13. An apparatus according to claim 11, including a separate water bleed communication from each boiler, separate means for adjusting each bleed communication to a constant capacity, a header connecting the outlet ends of said bleed communications, bleed controlling means for controlling the bleed from said header, and measuring means responsive to the salt concentration in one of said feed water communications for actuating the bleed controlling means for controlling the bleed from said header.

14. An apparatus, according to claim 11, including a check valve in said control steam bleed communication adapted to prevent loss of control tank steam pressure by reverse flow of steam.

MILTON EATON.

REFERENCES CITED

The following references are of record in the file of this patent:

UNITED STATES PATENTS

| Number | Name | Date |
|---|---|---|
| 315,160 | Pentecost | Apr. 7, 1885 |
| 635,042 | Goodwin | Oct. 17, 1899 |
| 2,185,786 | Eaton | Jan. 2, 1940 |
| 2,252,492 | Cortese | Aug. 12, 1941 |